United States Patent [19]

Takebuchi et al.

[11] Patent Number: 5,461,431
[45] Date of Patent: Oct. 24, 1995

[54] DISPLAY APPARATUS FOR TELEVISION FOR DISPLAYING AN IMAGE OF DIFFERENT SIZE ON A WHOLE DISPLAY SCREEN

[75] Inventors: Hideaki Takebuchi; Kazuhisa Ata; Kiyoyuki Tanaka; Chuichi Nohara, all of Tokyo, Japan

[73] Assignee: Pioneer Electroniccorporation, Tokyo, Japan

[21] Appl. No.: 257,191

[22] Filed: Jun. 8, 1994

[30] Foreign Application Priority Data

Jun. 8, 1993 [JP] Japan .................................. 5-137875

[51] Int. Cl.6 ...................................................... H04N 3/23
[52] U.S. Cl. .......................... 348/806; 348/556; 348/913; 315/368.18; 315/371
[58] Field of Search ...................................... 348/913, 556, 348/555, 445, 806, 704; 315/371, 399, 368.18; H04N 5/46, 3/23, 3/26

[56] References Cited

U.S. PATENT DOCUMENTS

| | | | |
|---|---|---|---|
| 4,724,485 | 2/1988 | Golab | 358/140 |
| 4,810,939 | 3/1989 | Watanabe et al. | 315/371 |
| 5,136,398 | 8/1992 | Rodriguez-Cavazos et al. | 315/399 |
| 5,229,692 | 7/1993 | Wilber | 315/371 |
| 5,249,049 | 9/1993 | Kranawetter et al. | 348/913 |
| 5,298,985 | 3/1994 | Tsujihara et al. | 348/806 |
| 5,369,450 | 11/1994 | Haseltine et al. | 348/806 |

FOREIGN PATENT DOCUMENTS 2-209092  8/1990  Japan .

Primary Examiner—James J. Groody
Assistant Examiner—Jeffrey S. Murrell
Attorney, Agent, or Firm—Sughrue, Mion, Zinn, Macpeak & Seas

[57] ABSTRACT

A display apparatus for a television having a screen of an aspect ratio different from that of an original image, wherein an image is distorted in at least one of the vertical and horizontal directions such that an expansion ratio or a reduction ratio gradually changes, and the distorted image is displayed on the screen. With the display apparatus, an image with a different aspect ratio can be displayed on the whole screen with minimally reduced missing image portions and distortion. Also, a vista size image can be displayed with an impression that a zoom-up effect is emphasized, while missing image portions are minimally reduced in left and right side portions.

11 Claims, 10 Drawing Sheets

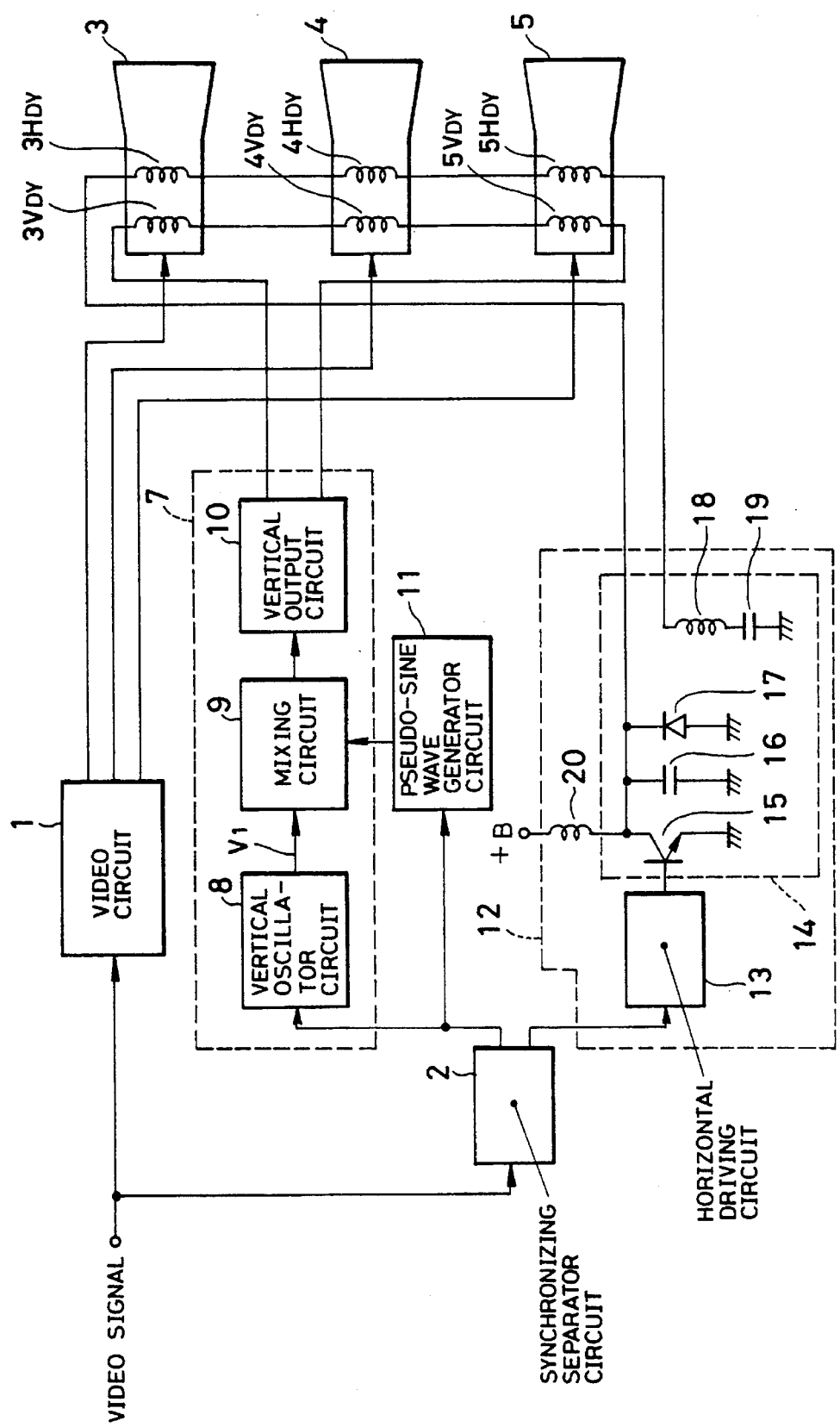

FIG. 2A  PRIOR ART  FIG. 2B
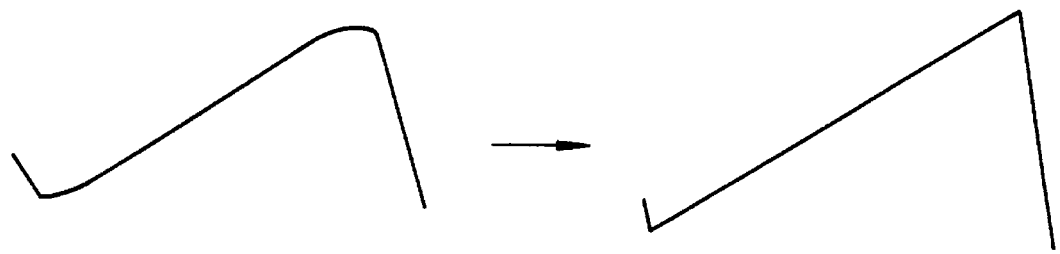
FIG. 3
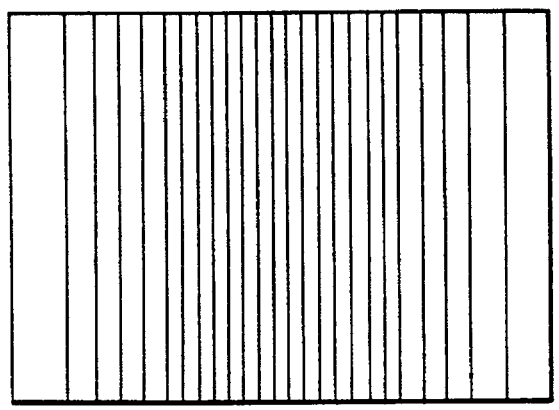
FIG. 4A  FIG. 4B
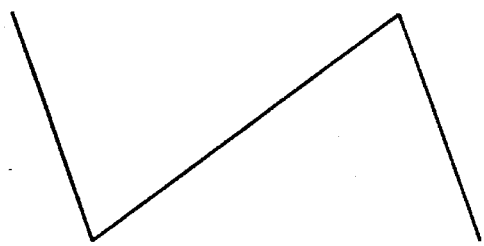 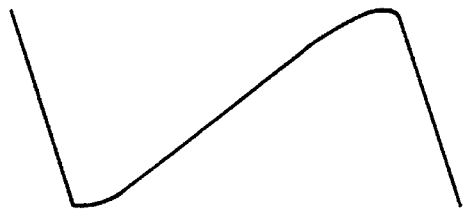

DISPLAY APPARATUS FOR TELEVISION FOR DISPLAYING AN IMAGE OF DIFFERENT SIZE ON A WHOLE DISPLAY SCREEN

BACKGROUND OF THE INVENTION

1. Field of the Invention

The present invention relates to a display apparatus for a television which has a screen with an aspect ratio different from that of original images.

2. Description of the Related Art

In televisions for the NTSC system, the aspect ratio is generally 4:3 (1.333:1). Images to be displayed on a display apparatus include a so-called vista size which accommodates an image having a width larger than that of normal images. The image of the vista size has an aspect ratio of approximately 16:8.6 (1.860:1). In the vista size image, video signals corresponding to portions above and below the image merely represent a black level, while the deflection operation of the television is performed to scan the vista size image in a manner similar to normal images.

Conventionally, for displaying a wider image as mentioned above on a display screen with the aspect ratio of 4:3, the width of the image is made coincident with the width of the screen, and spaces above and below the image is filled with black or gray color. Alternatively, the height of the image is made coincident with the height of the screen, and left and right side portions of the image are cut away.

However, with the first approach, the display screen is not effectively utilized. Moreover, if the display apparatus is used for a long time in such a condition, the difference in deterioration of fluorescent materials and display elements in the black or gray spaces and the image portion possibly causes color phase irregularity or the like.

On the other hand, the second approach presents a problem that video information is partly missing. If the image is scaled down by a constant ratio so as to make the width of the image coincident with the width of the screen, no video information will be missed. However, with this approach, the vista size image is contracted by approximately 28 percents in the horizontal direction, wherein a distorted image can be clearly viewed.

Generally, conventional display apparatuses have been designed in conformity with basic concepts of realizing high fidelity of displayed images, that is, eliminating any missing portion from original images; providing the same aspect ratio; and maintaining the linearity over the whole display screen. Thus, there have been no design thoughts or adjusting methods which dare to damage these concepts.

SUMMARY OF THE INVENTION

It is therefore an object of the present invention to provide a display apparatus for a television which is capable of displaying images of different aspect ratios on the whole area of a display screen while missing image and distortion are minimized.

The present invention provides a display apparatus for a television which has a screen with an aspect ratio different from that of an original image, characterized in that an image is distorted in at least one of the vertical and horizontal directions such that an expansion ratio or a reduction ratio of the image gradually changes, and the distorted image is displayed on the screen.

According to the present invention, an image is gradually expanded or contracted in at least one of upper and lower portions and right and left side portions to allow an image having an aspect ratio different from that of the screen to be displayed on the whole screen.

BRIEF DESCRIPTION OF THE DRAWINGS

FIG. 1 is a block diagram showing a first embodiment of the present invention;

FIGS. 2A and 2B are waveform charts showing horizontal deflection currents;

FIG. 3 is a diagram showing how an image is expanded in the horizontal direction;

FIGS. 4A and 4B are waveform charts showing vertical deflection currents;

DETAILED DESCRIPTION OF THE PREFERRED EMBODIMENTS

Figure 5:
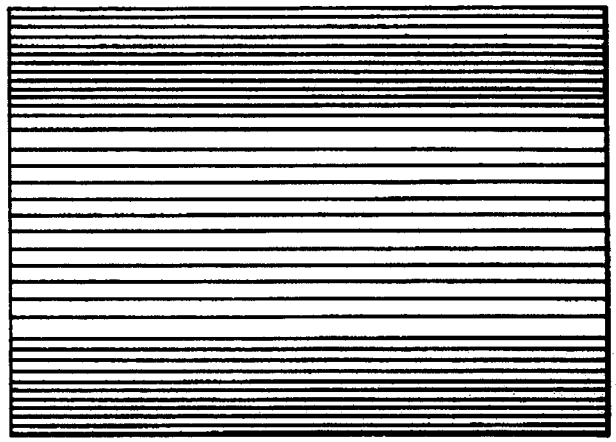
FIG. 5 is a diagram showing how an image is contracted in the vertical direction.

A display apparatus shown in FIG. 1, which is a first embodiment of the present invention, is used for a three-tube projection type television for projecting images having an aspect ratio of 4:3 on a screen having an aspect ratio of 16:10.5. In the display apparatus, an input composite video signal is supplied to a video circuit 1 as well as to a synchronizing separator circuit 2. The video circuit 1 generates three primary color signals of R, G, B (red, green, blue) from a video signal. The three primary color signals are supplied to corresponding red, green and blue CRTs 3–5, respectively. The synchronizing separator circuit 2 separates and extracts horizontal and vertical synchronizing signals from the video signal.

The vertical synchronizing signal is supplied to a vertical deflection circuit 7 which is composed of a vertical oscillator circuit 8, a mixer circuit 9, and a vertical output circuit 10.

The vertical oscillator circuit 8 generates a saw-tooth wave signal $V_1$ in synchronism with the vertical synchronizing signal, which is mixed with a pseudo-sine wave signal by the mixer circuit 9. While a third-order function wave is essentially desirable to be mixed with a saw-tooth wave (a first-order function waveform), the pseudo-sine wave is herein substituted for the third-order function wave. The pseudo-sine wave signal is generated by a pseudo-sine wave generator circuit 11 in synchronism with the vertical synchronizing signal. The vertical output circuit 10 supplies vertical deflection coils $3V_{DY}$–$5V_{DY}$ of the CRTs 2–5 with a vertical deflection current in accordance with an output signal of the mixer circuit 9. The deflection coils $3V_{DY}$–$5V_{DY}$ are connected in series.

The horizontal synchronizing signal separated by the synchronizing separator circuit 2 is supplied to a horizontal deflection circuit 12 which has a horizontal driver circuit 13 for generating a horizontal oscillating signal, in accordance with the horizontal synchronizing signal, which is supplied to a horizontal output circuit 14. The horizontal output circuit 14 has a transistor 15, a resonance capacitor 16, a damper diode 17, a linearity coil 18, and an S-curve correction capacitor 19. The transistor 15 is supplied at the base thereof with the horizontal oscillating signal from the horizontal driver circuit 13. The collector of the transistor 15 is applied with a power supply voltage +B through a first winding 20 of a fly-back transformer, and is also connected to one end of the resonance capacitor 16 and the cathode of the damper diode 17. The emitter of the transistor 15, the other end of the resonance capacitor 16, and the anode of the damper diode 17 are all grounded. A connection line to the collector of the transistor 15 is connected to horizontal deflection coils $3H_{DY}$–$5H_{DY}$ which are connected in series. One end of the series connection on the deflection coil $3H_{DY}$ side is connected to the connection line to the collector of the transistor 15, while the other end on the deflection coil $5H_{DY}$ side is connected to one end of the linearity coil 18, the other end of which is grounded through the S-curve correction capacitor 19.

In the above described configuration, when the transistor 15 in the horizontal output circuit 14 is off, the capacitors 16, 19 are charged by the power supply voltage +B. When a horizontal oscillating signal at high level is generated by the horizontal driver circuit 13 in response to the horizontal synchronizing signal separated by the synchronizing separator circuit 2, the transistor 15 is turned on in response to the horizontal synchronizing signal. This causes the horizontal deflection coils $3H_{DY}$–$5H_{DY}$ to be supplied with a current from the power supply +B and the S-curve correction capacitor 19. The supplying current increases substantially in linear fashion. When the horizontal oscillating signal goes low to turn the transistor 15 off, electromagnetic energy stored in the horizontal deflection coils $3H_{DY}$–$5H_{DY}$ begin to flow to charge the resonance capacitor 16.

When the electromagnetic energy has been charged in the resonance capacitor 16, no current flows into the horizontal deflection coils $3H_{DY}$–$5H_{DY}$. However, electrostatic energy stored in the resonance capacitor 16 is subsequently discharged to the deflection coils $3H_{DY}$–$5H_{DY}$ so that a current in the reverse direction flows through the deflection coils $3H_{DY}$–$5H_{DY}$. Next, when the electrostatic energy in the resonance capacitor 16 has been discharged, energy stored in the deflection coils $3H_{DY}$–$5H_{DY}$ are discharged through the damper diode 17, while the capacitor 19 is charged. Then, the transistor 15 is again turned on to repeat the above operations, with the result that a horizontal deflection current in the form of a saw-tooth wave flows through the deflection coils $3H_{DY}$–$5H_{DY}$.

In conventional apparatus, the waveform of the horizontal deflection current is blunted at peak and bottom portions by the action of the S-curve correction capacitor, as shown in FIG. 2A, in order to provide a uniform linearity in a horizontal scan. In this embodiment, however, the peak and bottom portions of the horizontal deflection current are made sharp, as shown in FIG. 2B, by appropriately setting the capacitance values for the linearity coil 18 and the S-curve correction capacitor 19. The sharp deflection current will result in a higher scan speed in left and right side portions on the screen of the CRTs 3–5. Stated another way, an image has left and right side portions expanded in the horizontal direction. For example, as shown in FIG. 3, equally spaced vertical lines in an original image are displayed such that a central portion of the screen has equally spaced vertical lines identical to the original image, but the spacing between the respective adjacent vertical lines expands in the horizontal direction in the left and right side portions.

In the mixer circuit 9, the saw-tooth wave signal $V_1$ generated by the vertical oscillator circuit 8 is mixed with the pseudo-sine wave signal to cause the saw-tooth wave signal $V_1$ shown in FIG. 4A to have blunted peak and bottom porions as shown in FIG. 4B. A vertical deflection current flows through the vertical deflection coils $3V_{DY}$–$5V_{DY}$ in accordance with the saw-tooth wave signal having the peak and bottom portions thus blunted. This results in a lower scan speed in upper and lower portions on the screens of the CRTs 3–5. In other words, upper and lower portions of an image on the screen are contracted in the vertical direction. For example, as shown in FIG. 5, equally spaced horizontal lines in an original image are displayed such that a central portion of the screen has equally spaced horizontal lines identical to the original image, but the spacing between the respective adjacent horizontal lines is contracted in the vertical direction in the upper and lower portions of the screen.

In this manner, by expanding left and right side portions of an image projected from the CRTs 3–5 and by contracting upper and lower portions of the same, when a true circle is positioned at the center of an original image, its roundness can be maintained substantially at 100 percent on the screen.

It should be noted that the magnitude of sharpness provided to the peak and bottom portions of the horizontal deflection current waveform and the magnitude of bluntness provided to the peak and bottom portions of the vertical deflection current waveform may be set in accordance with each case. Either one of them may produce similar effects.

Figure 6:
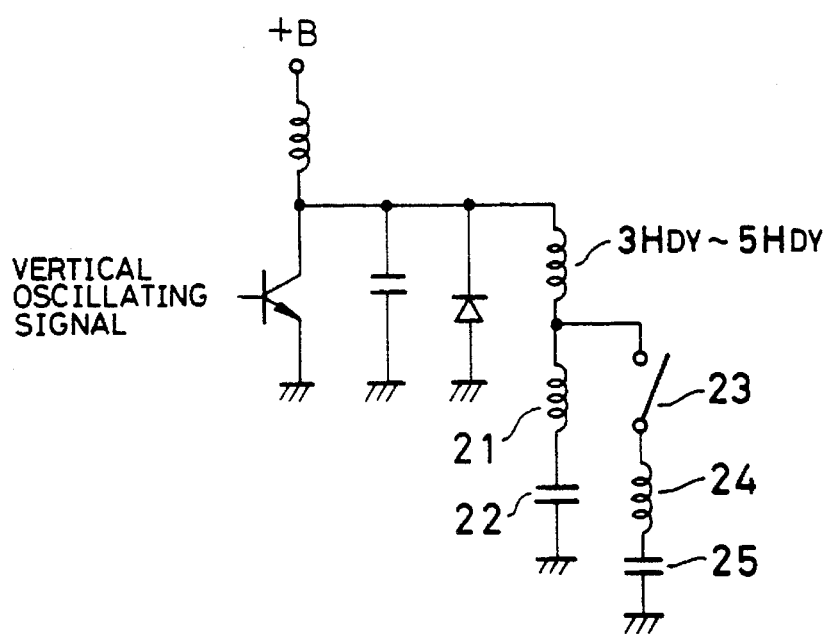
FIG. 6 is a circuit diagram showing another exemplary configuration of a horizontal output circuit.

The horizontal output circuit may be alternatively composed of a series circuit comprising a linearity coil 21 and an S-curve correction capacitor 22 and a series circuit comprising a switch 23, a linearity coil 24, and an S-curve correction capacitor 25 connected in parallel with the former series circuit, as shown in FIG. 6. The linearity coil 21 and the S-curve correction capacitor 22 have their capacitances set so as to blunt the peak and bottom portions of the horizontal deflection current waveform. Turning on the switch 23 results in adding the capacitances of the linearity coil 24 and the S-curve correction capacitor 25 to sharpen the peak and bottom portions of the horizontal deflection current waveform. Further alternatively, the horizontal output circuit may be provided with two sets of linearity coils and S-curve correction capacitors, to which different capacitances are set respectively, such that these sets are switched to select the sharp or blunted horizontal deflection current waveform.

Figure 7:
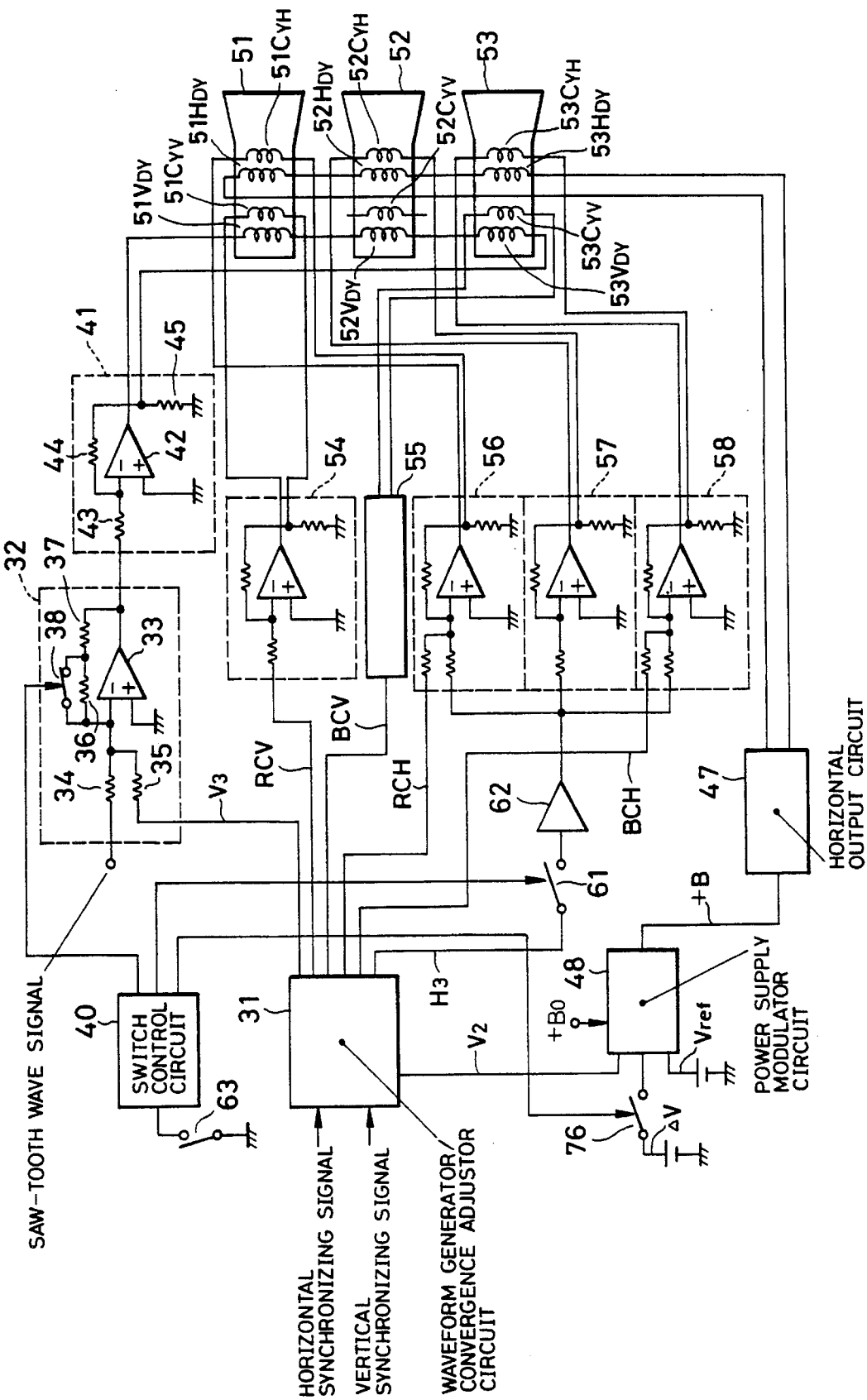
FIG. 7 is a block diagram showing a second embodiment of the present invention.

FIG. 7 shows a second embodiment of the present invention. This embodiment illustrates a display apparatus for a three tube type projection television for projecting a vista size image on a screen having an aspect ratio of 16:10.5. In the display apparatus, vertical and horizontal synchronizing signals separated and extracted from an input video signal are both supplied to a waveform generator/convergence adjustor circuit 31. The waveform generator/convergence adjustor circuit 31 individually generates a pseudo-sine wave signal $V_3$ in synchronism with the vertical synchronizing signal and a pseudo-sine wave signal $H_3$ in synchronism with the horizontal synchronizing signal, as well as generates convergence adjusting signals RCV, BCV, RCH, BCH in synchronism with the vertical and horizontal synchronizing signals. The waveform generator/convergence adjustor circuit 31 further generates a parabolic waveform signal $V_2$ for correcting left and right pincushion distortion.

The pseudo-sine wave signal $V_3$ is supplied to a mixer circuit 32 in which the pseudo-sine wave signal $V_3$ is mixed with a saw-tooth wave signal in synchronism with the vertical synchronizing signal, and the mixed signal is output therefrom. The mixer circuit 32 has a screen expanding function, and specifically comprises an operational amplifier 33, resistors 34–37, and an on-off switch 38. The operational amplifier 33 is supplied at its inverting input terminal with a saw-tooth wave signal through the resistor 34 and the pseudo-sine wave signal $V_3$ through the resistor 35. The non-inverting input terminal of the operational amplifier 33 is grounded. The resistors 36, 37 are connected in series between the inverting input terminal and an output terminal of the operational amplifier 33. Also, the resistor 36 is connected in parallel with the switch 38. The switch 38 is on-off controlled by a switch control circuit 40, later described, such that the amplification degree of the operational amplifier 33 is increased when the switch 38 is off.

The output of the mixer circuit 32 is connected to a vertical output circuit 41 which is an inverting amplifier circuit including an operational amplifier 42 and resisters 43–45. The vertical output circuit 41 supplies a vertical deflection current to vertical deflection coils $51V_{DY}$–$53V_{DY}$ of CRTS 51–53. The resistor 45 is provided for detecting the vertical deflection current, and a voltage proportional to the vertical deflection current is fed back through the resistor 44 to the inverting input terminal of the operational amplifier 42.

A horizontal output circuit 47 supplies a horizontal deflection current to horizontal deflection coils $51H_{DY}$–$53H_{DY}$ of the CRTs 51–53. The horizontal output circuit 47 is supplied with a power supply voltage +B from a power supply modulator circuit 48.

The display apparatus of this embodiment is provided with output circuits 54–58 for convergence adjustment. The output circuits 54, 55 are provided for red and blue convergence adjustment in the vertical direction. Although the output circuit 54 only is specifically illustrated in FIG. 7, the output circuits 54, 55 are identical inverting operational amplifiers, each of which is composed of an operational amplifier and a plurality of resistors. The output circuits 54, 55 are supplied with the convergence adjusting signals RCV, BCV, respectively, which are amplified by the respective output circuits 54, 55 and supplied to vertical dynamic convergence coils $51C_y$, $53C_{yv}$ of the red and blue CRTs 51, 53, respectively. A vertical dynamic convergence coil $52C_{YV}$ for green color is not used since the adjustment is made on the basis of green color. The output circuits 56–58 are provided for red, green and blue convergence adjustment in the horizontal direction, each of which is an inverting amplifier circuit composed of an operational amplifier and a plurality of resistors. The output circuits 56, 58 are respectively supplied with the convergence adjusting signals RCH, BCH from the convergence adjustor circuit 31, which are amplified and supplied to horizontal dynamic convergence coils $51C_{YH}$, $53C_{YH}$ of the CRTs 51, 53, respectively. While the output circuit 57 for green color is connected to supply a horizontal dynamic convergence coil $52C_{YH}$, a convergence adjusting signal is not supplied thereto.

The pseudo-sine wave signal $H_3$ from the waveform generator/convergence adjustor circuit 31 is supplied to a buffer amplifier 62 through an on-off switch 61. The output of the buffer amplifier 62 is connected to the output circuits 56–58. The switch 61 is on-off controlled by the switch control circuit 40, such that the pseudo-sine wave signal H3 is supplied to the output circuits 56–58, when the switch 61 is off, to be mixed with the convergence adjusting signals RCH, BCH in the output circuits 56, 58, respectively. The output circuit 57 amplifies the pseudo-sine wave signal H when the switch 61 is on.

The switch control circuit 40 is connected to a manually operable change-over switch 63. The switch control circuit 40 individually controls the switches 38, 61, 76 to be on or off in response to the state of the change-over switch 63.

Figure 8A:
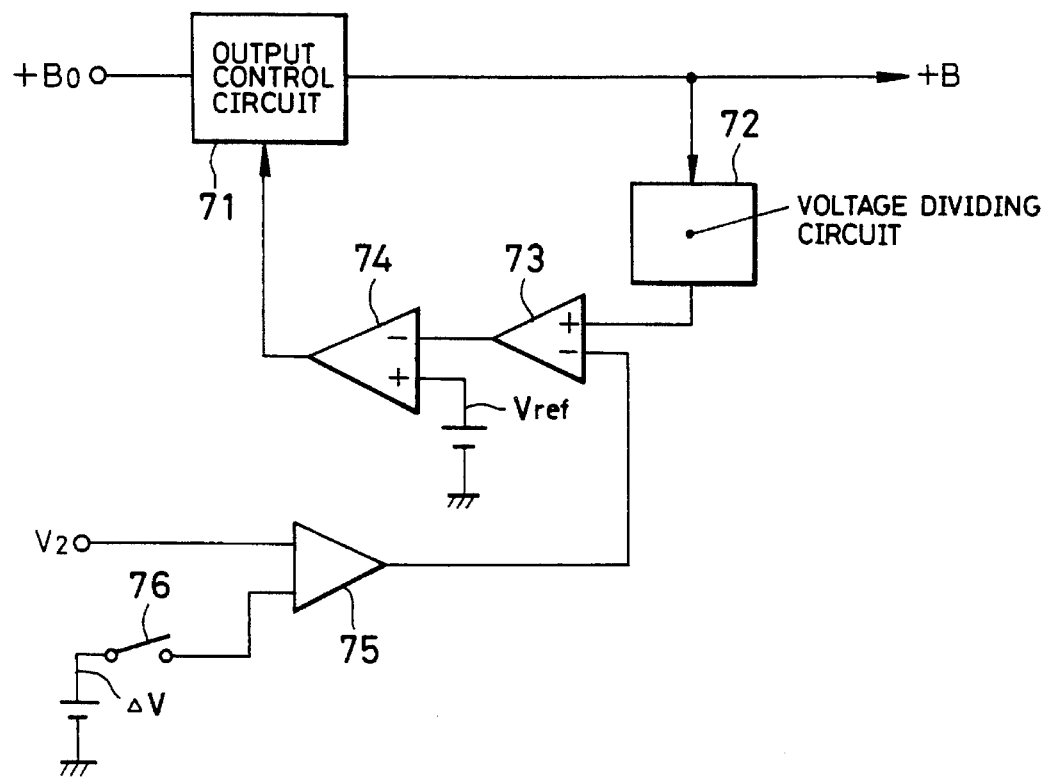
FIG. 8A is a block diagram showing the configuration of a power supply modulator circuit.
Figure 8B:
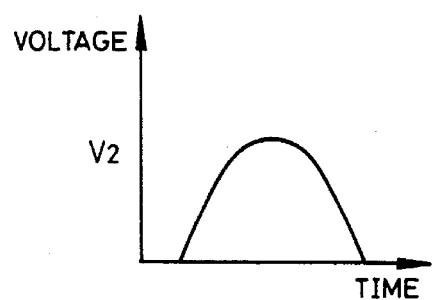
FIG. 8B is a waveform chart showing a parabolic waveform signal $V_2$.
Figure 8C:
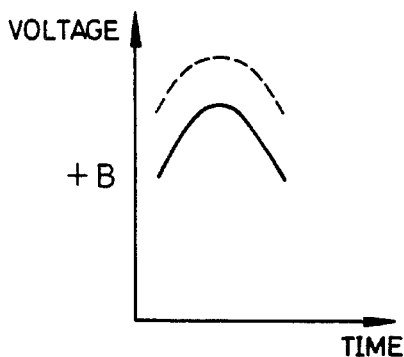
FIG. 8C is a waveform chart showing a power supply voltage +B.

The power supply modulator circuit 48 comprises an output control circuit 71, a voltage dividing circuit 72, a subtracter 73, a differential amplifier 74, and an adder 75. The output control circuit 71 including a power transistor and so on is supplied at its input terminal with a power supply voltage $+B_0$ and controls the level of the power supply voltage $+B_0$ in accordance with a voltage supplied to its control input terminal, to output the level controlled voltage as a supply voltage +B from its output terminal. The supply voltage +B is divided by the voltage dividing circuit 72 and supplied to an input terminal of the subtracter 73. The adder 75 is supplied at one input terminal with a parabolic waveform signal $V_2$ having a waveform as shown in FIG. 8B and at the other input terminal with a predetermined voltage $\Delta V$ through an on-off switch 76. An output signal of the adder 75 is supplied to the other input terminal of the subtracter 73. The switch 76 is on-off controlled by the switch control circuit 40. When the switch 76 is off, the parabolic waveform signal $V_2$ is supplied as it is from the adder 75 to the subtracter 73 which subtracts the signal $V_2$ from the divided voltage of the power supply voltage +B to produce a difference voltage. A difference voltage between the output voltage of the subtracter 73 and a reference voltage Vref is amplified by the differential amplifier 74, and the amplified voltage is supplied to the output control circuit 71 as a control signal. Since the control signal varies in accordance with the parabolic waveform signal $V_2$, the power supply voltage +B also varies in accordance with the parabolic waveform signal $V_2$, as indicated by the solid line waveform shown in FIG. 8C. When the switch 76 is on, the predetermined voltage $\Delta V$ is added to the parabolic waveform signal $V_2$ in the adder 75 which supplies the sum to the subtracter 73, so that the output voltage of the subtracter 73 is decreased. However, since the difference voltage between the output voltage of the subtracter 73 and the reference voltage Vref becomes larger, the control voltage is increased. Therefore, the power supply voltage +B varying in accordance with the parabolic waveform is entirely increased as indicated by the broken line waveform in FIG.

8C, in comparison with the power supply voltage +B generated when the switch 76 is off.

In the configuration of the second embodiment described above, when the change-over switch 63 is off, the switch 38 is controlled to be on, while the switches 61, 76 to be off. In this event, an image is displayed on the screen having the aspect ratio of 16:10.5 by a normal deflection operation on the basis of an input video signal. More specifically, the amplitude of the vertical deflection current flowing through the vertical deflection coils $51V_{DY}$–$53V_{DY}$ and the amplitude of the horizontal deflection current supplied from the horizontal output circuit 47 to the horizontal deflection coils $51H_{DY}$–$53H_{DY}$ determine scan amounts in the respective horizontal and vertical directions. With a vista size image, 96 percents of the horizontal scan period are displayed on the screen, 75 percents of the vertical scan period constitute an actual image portion, and black images are shown in 75–90 percent portions of the vertical scan period in the upper and lower portion of the screen.

When the change-over switch 63 is on, the switches 38, 61, 76 are controlled to be off, on, and on, respectively. The switch 38 in off state causes the amplification degree for the mixed signal of the mixer circuit 32 to become higher, whereby the amplitude of the vertical deflection current flowing through the vertical deflection coils $51V_{DY}$–$53V_{DY}$ is increased. With this operation, the image, which has upper and lower portions contracted by the pseudo-sine wave signal $V_3$ mixed with the video signal, is uniformly expanded in the vertical direction while the contraction is maintained.

Figure 10:
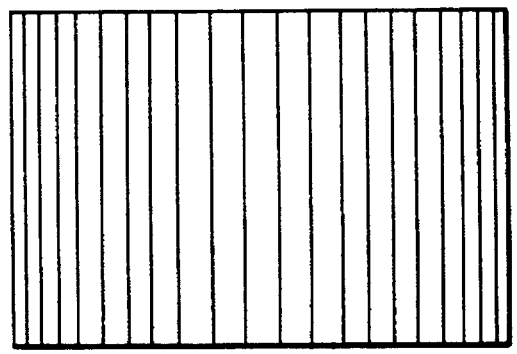
FIG. 10 is a diagram showing how an image is expanded and contracted in the horizontal direction.

The switch 76 in on state causes the power supply voltage +B applied to the horizontal output circuit 47 to entirely increase, so that the amplitude of the horizontal deflection current waveform becomes larger. Also, the switch 67 in on state causes the pseudo-sine wave signal component $H_3$ to be added to the convergence adjusting signals RCH, BCH. Since these convergence adjusting signals RCH, BCH with the pseudo-sine wave signal component $H_3$ are supplied to the horizontal dynamic convergence coils $51C_{YH}$, $53C_{YH}$, while the pseudo-sine wave signal H is supplied to the horizontal dynamic convergence coil $52C_{YH}$, the scan speed is corrected to be slower in left and right side portions on the screen of the CRTs 51–53. Stated another way, left and right side portions of the image are contracted in the horizontal direction. For example, as shown in FIG. 10, equally spaced vertical lines in an original image are displayed such that a central portion of the screen has equally spaced vertical lines identical to the original image, but the spacing between the respective adjacent vertical lines is contracted in the horizontal direction in the left and right side portions of the screen.

Figure 9A:
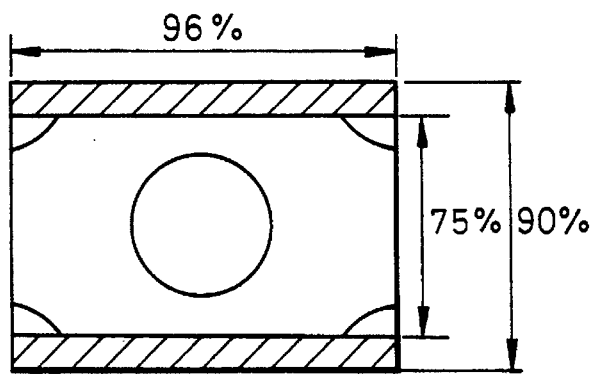
FIGS. 9A and 9B are diagrams each showing an example of how a vista size image is displayed.
Figure 9B:
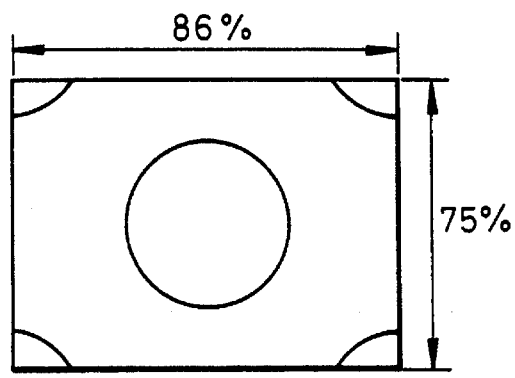

Thus, with a vista size image, 86 percents of the horizontal scan period are displayed on the screen, and an actual image portion in 75 percents of the vertical scan period is displayed over the whole screen area, as shown in FIG. 9B, resulting in displaying a so-called zoomed-up image (enlarged image). In this case, since a central portion of the screen is expanded in the vertical and horizontal directions, the image will give viewers an impression that the zoom-up effect is particularly emphasized.

Figure 11:
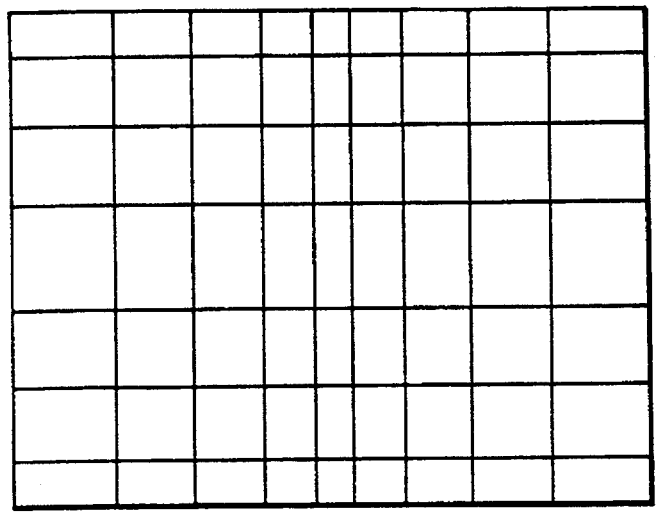
FIG. 11 is a diagram showing a display screen of a liquid crystal display unit as a third embodiment of the present invention.

FIG. 11 shows a third embodiment showing a liquid crystal display unit used in a display apparatus to which the present invention is applied. The illustrated liquid crystal display unit has a screen of an aspect ratio being 16:10.5, similarly to the aforementioned first embodiment, and is adapted to display images having an aspect ratio of 4:3. Specifically, liquid crystal cells corresponding to respective pixels forming the display screen have a horizontal dimension gradually longer as they are located further away from the center of the screen in the horizontal direction, and a vertical dimension gradually shorter as they are located further away from the center of the screen in the vertical direction. With the screen thus configured, an image can be displayed thereon with its left and right side portions expanded in the horizontal direction and upper and lower portions contracted in the vertical direction.

Figure 12:
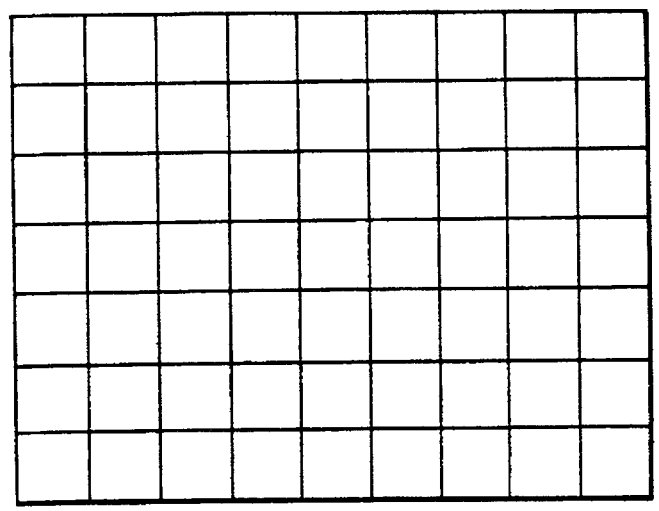
FIG. 12 is a diagram showing a display screen of a conventional liquid crystal display unit.

In a normal liquid crystal display unit having a screen of an aspect ratio being 4:3, liquid crystal cells of the identical shape, the number of which corresponds to that of pixels forming the screen, are arranged as shown in FIG. 12. It should be noted that a project type display unit is provided three liquid crystal display units for three primary colors R, G, B, while a direct-view type display unit has each of liquid crystal cells divided for three primary colors.

Figure 13:
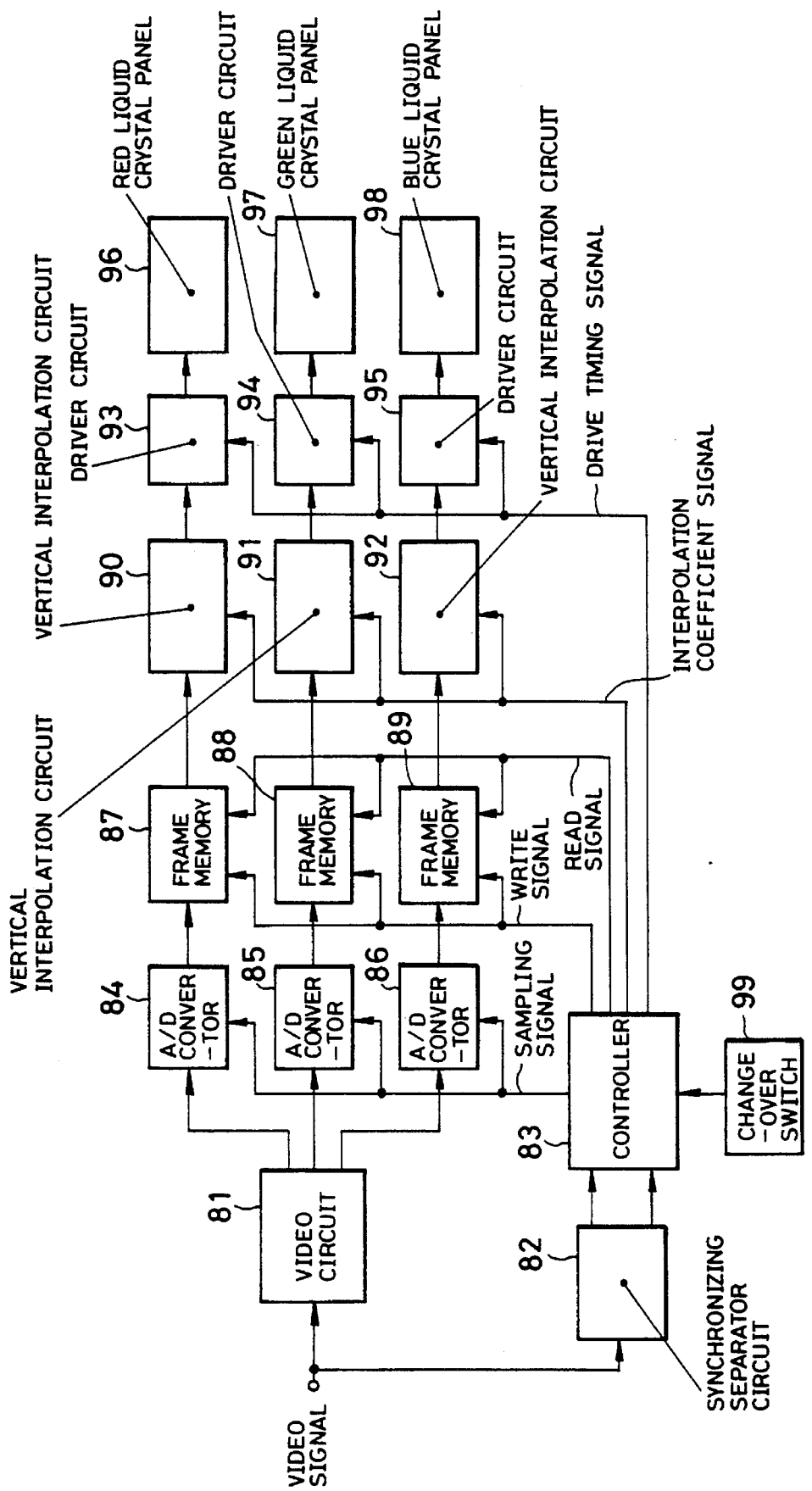
FIG. 13 is a block diagram showing a fourth embodiment of the present invention.

FIG. 13 shows a display apparatus using a normal liquid crystal display unit illustrated in FIG. 12, which is a fourth embodiment of the present invention. In this display apparatus, an input video signal is supplied to a video circuit 81 and a synchronizing separator circuit 82. The video circuit 81 generates three primary color signals for R, G, B from the input video signal. The synchronizing separator circuit 82 separates and extracts vertical and horizontal synchronizing signals and supplies them to a controller 83. The controller 83 generates a sampling signal, a write signal, a read signal, an interpolation coefficient signal, and a drive timing signal in response to the vertical and horizontal signals or a switching signal from a change-over switch 99.

The three primary color signals output from the video circuit 81, which are processed individually for green, red and blue colors, are converted into digital signals by respective A/D convertors 84–86 at a timing corresponding to the sampling signal, and the digital primary color signals are supplied to corresponding frame memories 87–89. In each of the frame memories 87–89, corresponding one of the digital three primary color signals is sequentially written, in at least one frame unit, in a predetermined order in response to the write signal. The digital three primary color signals written therein are read in a predetermined order in response to the read signal. The read color signals are supplied to vertical interpolation circuits 90–92. The vertical interpolation circuits 90–92 each interpolate the read color signals in accordance with an interpolation coefficient signal indicative of an interpolation coefficient. Driver circuits 93–95 generate voltages for driving red, green and blue liquid crystal panels 96–98 of the liquid crystal display unit in synchronism with the drive timing signal in response to signals output from the vertical interpolation circuits 90–92.

Figures 14A, 14B, 14C, 14D, 14E:
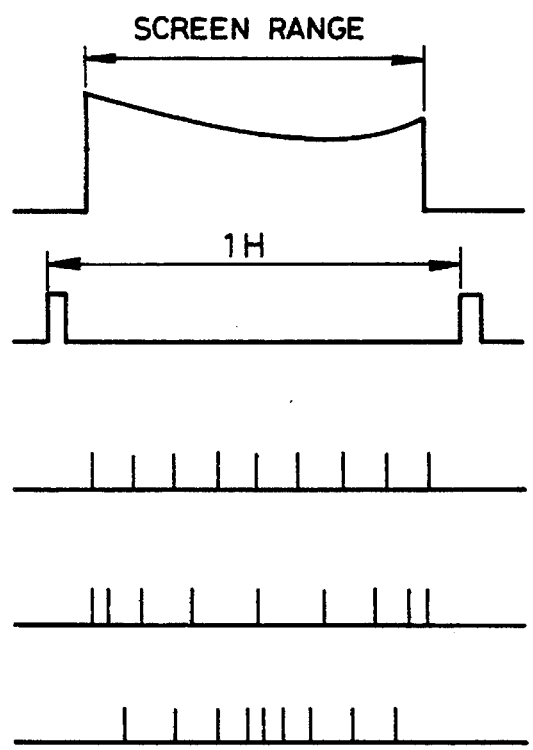
FIGS. 14A–14E are diagrams showing generation timings of sampling signals.

The display apparatus of this embodiment expands or contracts left and right side portions of an image in accordance with the timing at which the sampling signal is generated from the controller 83. FIG. 14A shows, by way of example, one of the three primary color signals output from the video circuit 81, and FIG. 14B shows the horizontal synchronizing signal and a 1H (one horizontal scan) period. When the sampling signal is generated at equal intervals as shown in FIG. 14C, an image is displayed as it is without being partially expanded or contracted. FIG. 14D shows that the sampling signal is generated at relatively short intervals after the horizontal synchronizing signal is generated, then at gradually longer intervals until a H/2 period, corresponding to the center of the screen, has passed, and at gradually shorter intervals in the subsequent H/2 period. With the sampling signal generated at the timings described above, an image is expanded in left and right side portions in the horizontal direction. FIG. 14E shows that the sampling signal is generated at relatively long intervals after the horizontal synchronizing signal has been generated, then at gradually shorter intervals until a H/2 period, corresponding to the center of the screen, has passed, and at gradually longer intervals in the subsequent H/2 period. It is assumed herein that the starting point and end point of the sampling are set at points closer to the center of the screen, in comparison with FIG. 14D. With the sampling signal generated at the timings as described above, an image is displayed in such a manner that left and right side portions are contracted in the horizontal direction, and a central portion is zoomed up. The selection of the generation timing for the sampling signal is specified by operating the change-over switch 99.

Figure 15:
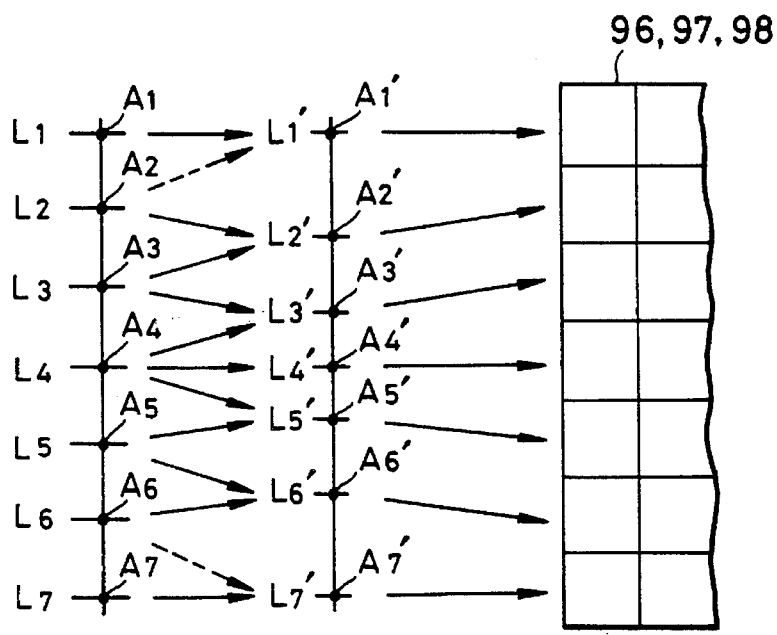
FIG. 15 is a diagram showing a concept of an interpolation operation.

FIG. 15 shows a concept of an interpolation operation executed in the vertical interpolation circuits 90–92. Specifically explaining, $L_1$–$L_7$ designate primary color signal lines (horizontal scan lines). From the values $A_1$–$A_7$ of signals at the same sampling position on the respective lines $L_1$–$L_7$, signal values $A_1'$–$A_7'$ on interpolated lines $L_1'$–$L_7'$, are calculated by the following equations:

$$A_1'=k_1A_1+(1-k_1)A_2=A_1$$

$$A_2'=k_2A_2+(1-k_2)A_3$$

$$A_3'=k_3A_3+(1-k_3)A_4$$

$$A_4'=A_4$$

$$A_5'=k_5A_4+(1-k_5)A_5$$

$$A_6'=k_6A_5+(1-k_6)A_6$$

$$A_7'=k_7A_6+(1-k_7)A_7=A_7$$

where the interpolation coefficients k (n is an integer) satisfy $0 \leq k_n \leq 1$, and $k_1=1$, $k_7=0$.

The signal values $A_1'$–$A_7'$ thus interpolated are derived at each timing position, and used as the bases to drive liquid crystal cells arranged with the same spacing therebetween on the liquid crystal panels 96–98. In FIG. 15, the relationship between the signal values $A_1'$–$A_7'$ and the respective liquid crystal cells is indicated by arrows. It can be understood from FIG. 15 that an image which is contracted in upper and lower portions, is displayed over the screen of the display unit.

Figure 16:
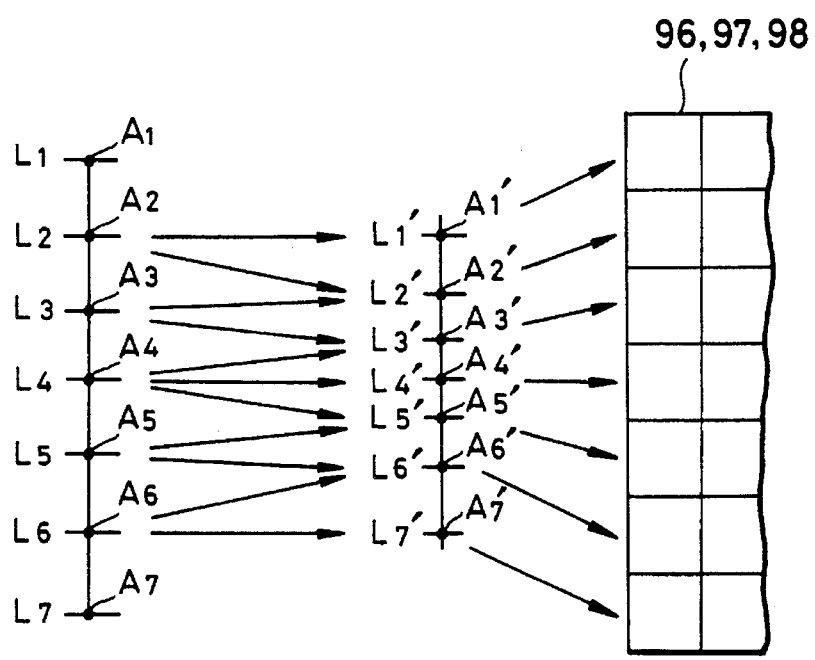
FIG. 16 is a diagram showing a concept of another interpolation operation.

Alternatively, for displaying an image which is zoomed up in the vertical direction and expanded in a central portion on the screen of the display unit, signal values $A_1'$–$A_7'$, on interpolated lines $L_1'$–$L_7'$ are calculated by the following equations from signal values $A_2$–$A_6$ at the same sampling position on lines $L_1$–$L_7$, as shown in FIG. 16:

$$A_1'=j_1A_2+(1-j_1)A_3=A_2$$

$$A_2'=j_2A_2+(1-j_2)A_3$$

$$A_3'=j_3A_3+(1-j_3)A_4$$

$$A_4'=A_4$$

$$A_5'=j_5A_4+(1-j_5)A_5$$

$$A_6'=j_6A_5+(1-j_6)A_6$$

$$A_7'=j_7A_5+(1-j_7)A_6=A_6$$

where the interpolation coefficients $j_n$ (n is an integer) satisfy $0<j_n<1$, and $j_1=j_7=0$.

Similarly to the interpolation shown in FIG. 15, the signal values $A_1'$–$A_7'$ thus interpolated are derived at each timing position, and used as the bases to drive liquid crystal cells arranged with the same spacing therebetween on the liquid crystal panels 96–98. Also, in FIG. 16, the relationship between the signal values $A_1'$–$A_7'$ and the respective liquid crystal cells is indicated by arrows.

While in the fourth embodiment described above, non-linearization is carried out by varying the sampling timing in the horizontal direction, digital three primary color signal data may be newly calculated by interpolation with adjacent data, similarly to the non-linearization in the vertical direction.

Also, while the aspect ratio of the display apparatus is set to 16:10.5 in the foregoing embodiments, similar effects can be produced with the aspect ratio ranging approximately from 16:10 to 16:11.

As described above, the display apparatus of the present invention displays an image which is distorted in at least one of the vertical and horizontal directions such that an expansion ratio or a reduction ratio gradually changes, whereby images of different aspect ratios can be displayed over the whole screen with minimum missing image and distortion. For example, when an image having an aspect ratio of 4:3 is displayed on a screen having an aspect ratio of 16:10.5, the image can be displayed in such a manner that distortion in necessary image information portion is reduced and the whole screen is fully utilized. Also, a vista size image can be displayed with an impression that a zoom-up effect is particularly emphasized, while missing image is minimized in left and right side portions.

What is claimed is:

1. A display apparatus for a television having a screen with an aspect ratio which is different from that of an original image, comprising:

a cathode ray tube (CRT) for displaying images on said screen; and a horizontal deflection circuit for supplying a horizontal deflection coil of said CRT with a saw-tooth horizontal deflection current having a waveform with sharp peak portions or blunted peak portions in comparison with a waveform for obtaining a uniform linearity in a horizontal scan so that an image is distorted in the horizontal direction such that an expansion ratio or a reduction ratio of the image gradually changes, and the distorted image is displayed on said screen.

2. A display apparatus according to claim 1, wherein said horizontal deflection circuit includes a linearity coil and an S-curve correction capacitor inserted in a path through which said horizontal deflection current flows, and at least one of the constants of said linearity coil and said S-curve correction capacitor is set so as to provide said saw-tooth horizontal deflection current with sharp peak portions.

3. A display apparatus according to claim 1, further comprising:

a sine-wave generator circuit for generating a sine or pseudo-sine wave signal in synchronism with a horizontal synchronizing signal separated from a composite video signal;

an adjusting signal generating circuit for generating convergence adjusting signals in synchronism with said horizontal synchronizing signal; and a horizontal convergence output circuit for supplying a horizontal convergence coil of said CRT with a horizontal convergence current in accordance with an output signal of said adjusting signal generating circuit, wherein said adjusting signal generating circuit generates said convergence adjusting signals mixed with said sine or pseudo-sine wave signal.

4. A display apparatus according to claim 3, further comprising:

a power supply circuit for generating a power supply voltage which comprises a parabolic waveform voltage in synchronism with a vertical synchronizing signal separated from a composite video signal, in order to correct pincushion distortion; and a horizontal output circuit, supplied with said power supply voltage, for outputting said horizontal deflection current to said horizontal deflection coil of said CRT, wherein said power supply circuit raises the level of said supply voltage by a predetermined value in response to an image size switching signal.

5. A display apparatus according to claim 1, comprising a liquid crystal display unit for displaying images, wherein liquid crystal cells corresponding to respective pixels forming a display ,screen of said liquid crystal display unit have horizontal dimensions which are made gradually longer or shorter as they are located further away from the center of the screen in the horizontal direction.

6. A display apparatus according to claim 1, comprising a liquid crystal display unit for displaying images, wherein liquid crystal cells corresponding to respective pixels forming a display screen of said liquid crystal display unit have vertical dimensions which are made gradually longer or shorter as they are located further away from the center of the screen in the vertical direction.

7. A display apparatus according to claim 1, comprising:

a sampling timing circuit for generating a sampling timing signal at predetermined intervals during each horizontal scan period of a video signal;

a sampling circuit for sampling said video signal in accordance with said sampling timing signal; and a memory for storing the sampled video signal.

8. A display apparatus according to claim 1, comprising:

a sampling timing circuit for generating a sampling timing signal at predetermined intervals during each horizontal scan period of a video signal;

a sampling circuit for sampling said video signal in accordance with said sampling timing signal;

a memory for storing the sampled video signal; and an interpolation calculating circuit for reading the stored video signal from said memory and for performing interpolation in accordance with the read digital video signal to generate a new video signal.

9. A display apparatus according to claim 1, comprising:

a sampling timing circuit for generating a sampling timing signal at predetermined intervals during each horizontal scan period of a video signal;

a sampling circuit for sampling said video signal in accordance with said sampling timing signal;

a memory for storing the sampled video signal;

a liquid crystal display unit having liquid crystal cells arranged for displaying images, the number of said liquid crystal cells corresponding to the number of pixels forming a display screen; and a driver circuit for driving said liquid crystal display unit in accordance with an output video signal of said interpolation calculating circuit.

10. A display apparatus for a television having a screen with an aspect ratio which is different from that of an original image, comprising:

a CRT for displaying images on said screen; and a vertical deflection circuit for supplying a vertical deflection coil of said CRT with a saw-tooth vertical deflection current having a waveform with blunted peak portions in comparison with a waveform for obtaining a uniform linearity in a vertical scan, so that an image is distorted in the vertical direction such that an expansion ratio or a reduction ratio of the image gradually changes, and the distorted image is displayed on said screen.

11. A display apparatus according to claim 10, wherein said vertical deflection circuit includes:

a vertical oscillator circuit for generating a vertical oscillating signal in synchronism with a vertical synchronizing signal separated from a composite video signal;

a sine-wave generator circuit for generating a sine or pseudo-sine wave signal in synchronism with said vertical synchronizing signal;

a mixer circuit for mixing said vertical oscillating signal with said sine or pseudo-sine wave signal to produce a saw-tooth wave signal having said blunted peak portions; and a vertical output circuit for supplying said vertical deflection coil with said vertical deflection current having a waveform in accordance with an output signal waveform of said mixer circuit.

* * * * *